United States Patent [19]

Chiv

[11] Patent Number: 5,458,347
[45] Date of Patent: Oct. 17, 1995

[54] BUMPER ARRANGEMENT FOR NESTABLE CARTS

[75] Inventor: Lim Chiv, Richmond, Va.

[73] Assignee: Rehrig International, Inc., Richmond, Va.

[21] Appl. No.: 182,398

[22] Filed: Jan. 18, 1994

[51] Int. Cl.[6] ............................................. B62B 3/18
[52] U.S. Cl. ............................ 280/33.992; 280/33.991; 280/33.996; 280/33.997; 280/DIG. 4
[58] Field of Search .................... 280/33.992, 33.991, 280/DIG. 4, 33.995, 33.996, 33.997, 47.34

[56] References Cited

U.S. PATENT DOCUMENTS

| | | | |
|---|---|---|---|
| 2,479,530 | 9/1946 | Watson | 280/DIG. 4 |
| 3,627,344 | 12/1971 | Rizzuto | 280/47.34 |
| 3,999,774 | 12/1976 | Rehrig . | |
| 4,123,077 | 10/1978 | Joseph . | |
| 4,632,411 | 12/1986 | Badger | 280/33.991 |
| 5,255,930 | 10/1993 | Jones et al. | 280/33.992 |
| 5,340,133 | 8/1994 | Trubiano | 280/33.992 |

FOREIGN PATENT DOCUMENTS

| | | | |
|---|---|---|---|
| 5058304 | 3/1993 | Japan | 280/33.997 |
| 9302903 | 2/1993 | WIPO | 280/33.991 |

Primary Examiner—Margaret A. Focarino
Assistant Examiner—Min S. Yu
Attorney, Agent, or Firm—Bacon & Thomas

[57] ABSTRACT

A plastic basket of a nestable cart is supported upon a frame thereof by a reinforcing member that is integrally formed with at least one bumper at the front panel of the cart. The bumper is adapted to contact a support member carried by a rear panel of a similarly constructed cart such that, when the two carts are nested, the bumper abuts the support member in order to force pivoting of the rear panel without undue wear of any plastic.

11 Claims, 4 Drawing Sheets

5,458,347

BUMPER ARRANGEMENT FOR NESTABLE CARTS

BACKGROUND OF THE INVENTION

1. Field of the Invention

The present invention pertains to nestable carts for use at supermarkets or the like and, more particularly, to a bumper arrangement for use on nestable carts.

2. Discussion of the Prior Art

Nestable carts for use at supermarkets or the like are widely known in the art. In general, such carts each include a basket supported upon a metal frame wherein the basket is formed with a rear panel that is adapted to pivot upon being engaged by a front portion of another cart. With this arrangement, the front portion of one cart can become nested within the basket of the other cart. This enables numerous carts to be stored in a compact manner.

The baskets for such carts are either formed from metal wires or plastic. Forming the baskets from plastic has numerous advantages since, for example, the baskets can be made lighter for ease of maneuverability, the plastic will not rust or corrode, and the baskets are less likely to cause damage to vehicles in the parking lot of a store using such baskets. Unfortunately, carts made with plastic baskets suffer from the drawback that when the carts are nested or unnested, direct plastic-to-plastic or plastic-to-metal contact can occur which will, over time, wear the plastic down in the contact areas.

In the prior art, this problem has been solved by providing bumpers at the contact areas between the carts in order to protect the plastic. For example, U.S. Pat. No. 3,999,774 discloses a cart having a plastic basket that is, at least partially, attached to a cart frame by a metal reinforcing ring that extends within a groove formed about the upper, outer perimeter of the basket. At the front panel of each cart, a pair of spaced bumpers are separately secured, for instance by welding, to the reinforcing ring. The bumpers are adapted to directly engage other contact members carried by the rear panel of another cart in order to prevent direct engagement between plastic portions of the baskets during nesting and unnesting of the carts.

Although the presence of the bumpers functions well to protect the plastic baskets from undue wear, the connections between the bumpers and the reinforcing ring have been known to fail over time mainly due to the fatigue loading placed thereon. In addition, assembly of the bumpers to the reinforcing ring requires an additional manufacturing step, as well as the production of additional components. Obviously, these factors result in increased repair and manufacturing costs.

Therefore, there exists a need in the art for a bumper arrangement for use on plastic, nestable carts which will not only function to protect the plastic of the cart baskets from undue wear but which will be more economical to manufacture and more reliable.

SUMMARY OF THE INVENTION

According to the present invention, a nestable cart is provided that includes a basket made of plastic, such as polyethylene, wherein the basket is, at least partially, supported upon a frame by a reinforcing member and wherein the reinforcing member is integrally formed with at least one bumper at the front panel of the cart. The bumper is adapted to engage a contact member carried by a rear panel of a similarly constructed cart such that, when the two carts are nested, the bumper abuts the contact member in order to force pivoting of the rear panel.

By this arrangement, the plastic baskets are protected from undue wear that can occur during nesting and unnesting of the carts. In addition, by integrally forming the reinforcing member with the bumper, substantial savings in both manufacturing costs and efficiency can be achieved. Furthermore, the bumper arrangement will be more reliable than that associate with the prior art.

Additional features and advantages of the invention will become more readily apparent form the following detailed description of a preferred embodiment thereof when taken in conjunction with the following drawings wherein like reference numerals refer to corresponding parts in the several views.

DETAILED DESCRIPTION OF THE PREFERRED EMBODIMENT

Figure 1:
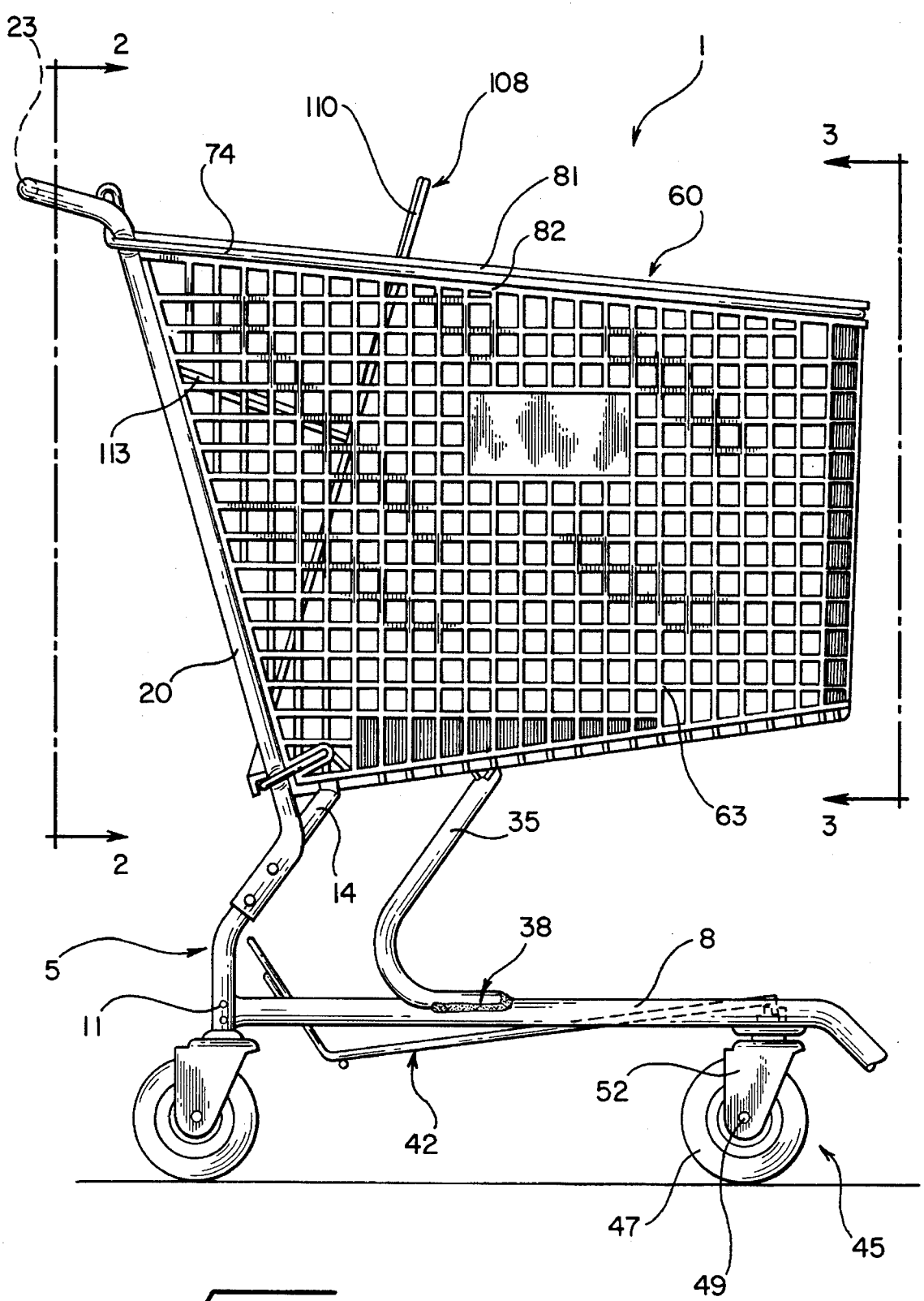
FIG. 1 is a side view of a grocery cart incorporating the bumper arrangement of the present invention.
Figure 2:
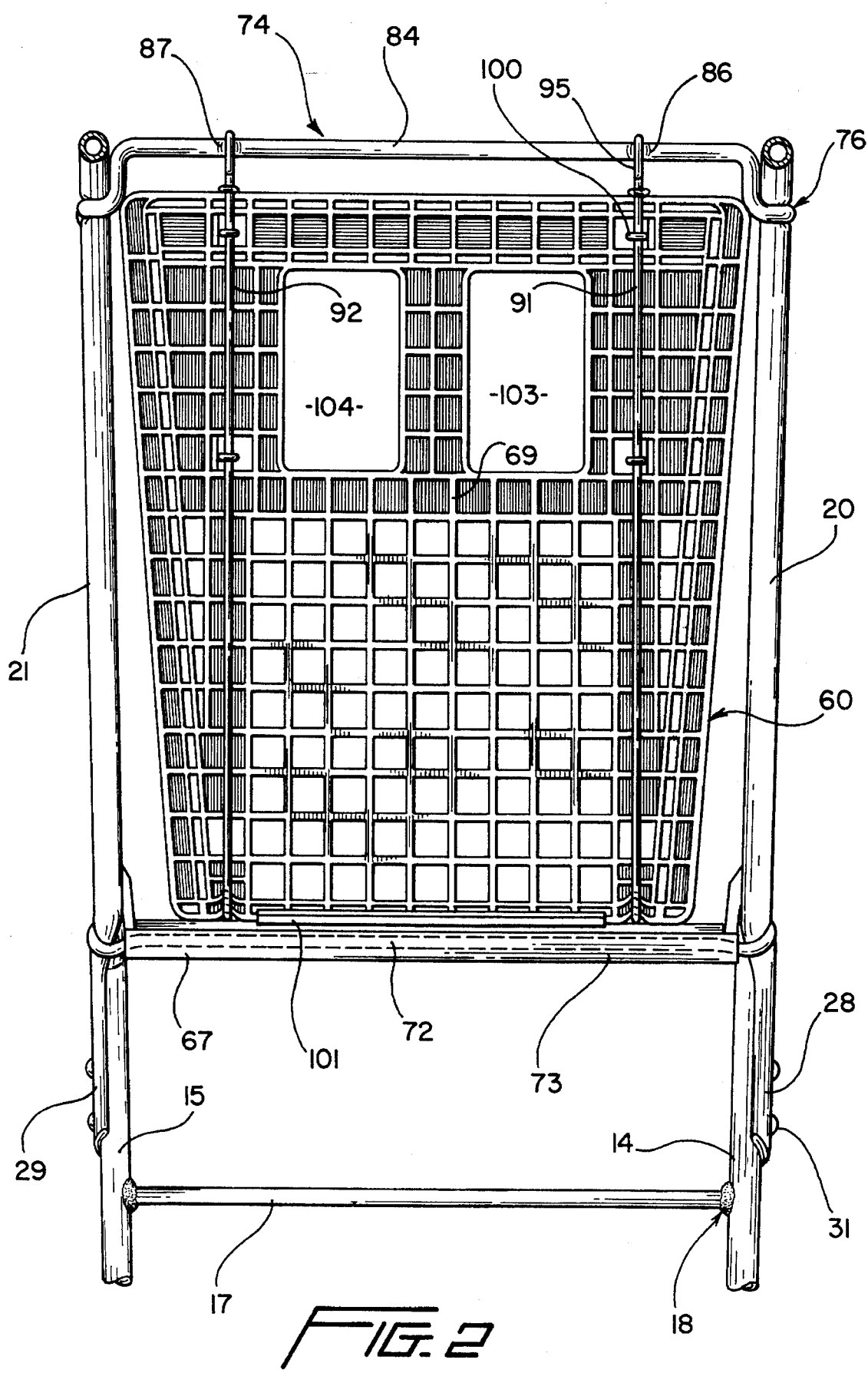
FIG. 2 is a sectional view taken through line 2—2 of FIG. 1.
Figure 3:
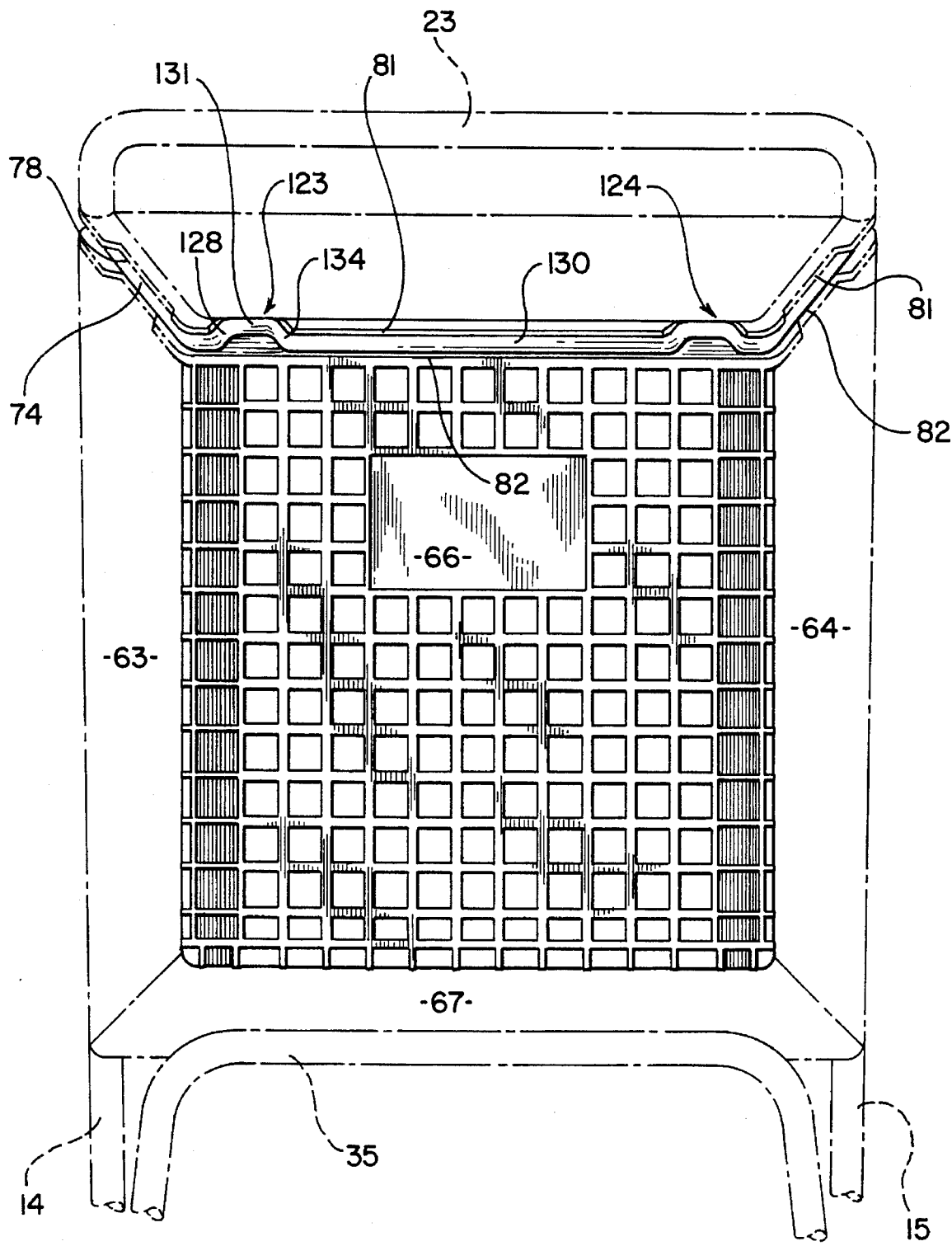
FIG. 3 is a front elevational view of the cart basket taken along line 3—3 of FIG. 1.

Initial reference is made to FIGS. 1–3 which depict a cart 2, generally of the type commonly used at supermarkets or the like, which incorporates the bumper arrangement of the present invention. Cart 2 is generally formed from a tubular frame 5 that includes a substantially U-shaped base 8 that is secured by rivets 11 to a pair of rear upstanding supports 14, 15. Rear upstanding supports 14, 15 are interconnected by a crossbar 17. Preferably, cross bar 17 is welded at its ends to rear upstanding supports 14 and 15 respectively such as indicated at 18 in FIG. 2. Frame 5 further includes a pair of upstanding posts 20, 21 that are preferably formed as a single unit and are interconnected by means of a transversely extending handle 23. Each upstanding post 20, 21 includes an associated clenched end 28, 29 which is fixedly secured to rear upstanding supports 14 and 15 respectively, preferably by a plurality of rivets 31. In addition, frame 5 includes an intermediate, upstanding support 35 as best shown in FIGS. 1 and 3. Intermediate, upstanding support 35 is secured at its respective ends to base 8 such as at weld location 38.

As is known in the art, cart 2 can further be provided with a lower platform 42 that is supported by base 8. Lower platform 42, for example, can be formed from a plurality of wires or from plastic. Frame 5 is supported by a plurality of casters 45. Preferably, four casters are provided, two forward and two in the rear. Each caster 45 comprises a wheel 47 that is rotatably mounted upon a generally horizontally extending axle 49 that, in turn, is supported by a U-shaped bracket 52. As is known in the art, each bracket 52 is adapted to pivot about a generally vertical axis such that casters 45 are permitted to swivel.

Cart 2 further includes a plastic basket 60. In the preferred embodiment, basket 60 is formed from polyethylene which is ideally suited to this application since polyethylene is relatively strong and panels manufactured therefrom are flexible enough to absorb some deformation, such as caused by impact, without breaking. However, it should be recognized that other polymer materials having similar properties can also be used. Basket 60 comprises two side panels 63 and 64, a front panel 66, a bottom panel 67 and a rear panel 69. Side panels 63, 64, front panel 66 and bottom panel 67 are preferably injection molded as a single, integral unit. On the other hand, rear panel 69 is formed as a separate piece and is adapted to pivot relative to the remainder of basket 60 in the manner which will be more fully described below. The entire basket 60 is preferably formed as an open lattice structure as is known in the art. Basket 60 is adapted to be supported by frame 5 and directly engages rear upstanding supports 14, 15 and intermediate, upstanding support 35. In addition, an attachment member 72, preferably in the form of a rod which is positioned below and forward of the rearmost end 73 of bottom panel 67, extends around upstanding posts 20, 21 and is attached to side panels 63 and 64.

The support arrangement for plastic basket 60 further includes a reinforcing member 74 that is preferably in the form of a ring that is welded to upstanding post 20 and 21 such as at 76 (see FIG. 2). Reinforcing member 74 extends within a channel 78 formed about the upper, outer periphery of plastic basket 60. Channel 78 is defined by generally horizontally extending and vertically spaced rim portions 81 and 82 of basket 60 and opens outwardly of basket 60. As best shown in FIG. 2, reinforcing member 74 includes a generally horizontally extending portion 84 that is positioned between upstanding posts 20, 21. Portion 84 of reinforcing member 74 includes two transversely spaced, crimped segments 86, 87 (see FIG. 2) which function to prevent a pair of support rods 91, 92 from shifting laterally outwardly of basket 60. More specifically, support rods 91 and 92 are each formed at their upper ends with a pivot loop 95 that extends about portion 84 of reinforcing member 74 adjacent to a respective crimped segment 86, 87. Support rods 91 and 92 are secured to rear panel 69 at the lower ends thereof and at various vertically spaced locations by means of connectors such as those indicated at 100. By means of this mounting arrangement of rear panel 69 with reinforcing member 74 by means of support rods 91 and 92 rear panel 69 is permitted to pivot relative to side panels 63, 64, front panel 66 and bottom panel 67 about an axis defined by portion 84 of reinforcing member 74.

As clearly shown in the drawings, rear panel 69 tapers downwardly and the entire basket 60 tapers forwardly. In addition, side panels 63 and 64 are located slightly, laterally outwardly of rear panel 69 and bottom panel 67 is arranged slightly below the lowermost portion of rear panel 69. By this arrangement, rear panel 69 is permitted to pivot, by means of the interconnections between support rods 91, 92 and portion 84 of reinforcing member 74, between side panels 63 and 64 in order to permit nesting of various carts 2 that are constructed in a similar manner. As is known in the art, this nesting occurs by pushing the front panel 66 of one cart 2 into the rear panel 69 of another cart 2 in order to cause pivoting of rear panel 69 such that both rear panel 69 and a front portion of the other cart extend within basket 60. When unnested, a stop member 101 (see FIG. 2), that projects upwardly from and is preferably integrally formed with bottom panel 67, limits the permitted rearward pivoting of rear panel 69. As discussed earlier in this application, when constructing a cart with a plastic basket, the engagement of the front and rear panels of the carts can cause undue wear of the plastic which is highly undesirable. Therefore, the bumper arrangement of the present invention, as will be described in detail below, is provided to protect the plastic baskets from any undue wear during nesting and unnesting that could occur upon direct plastic-to-plastic or plastic-to-metal contact.

For the sake of completeness, it should be mentioned that cart 2 can also be provided with a pair of leg holes 103, 104 formed in rear panel 69 that are associated with a retractable seat assembly 108 in a manner known in the art. Retractable seat assembly 108 is generally formed from a back portion 110 and a seat portion 113. Since the structure and function of retractable seat assembly 108 is seen to be widely known in the art, this assembly will not be further discussed in detail herein.

Figure 4:
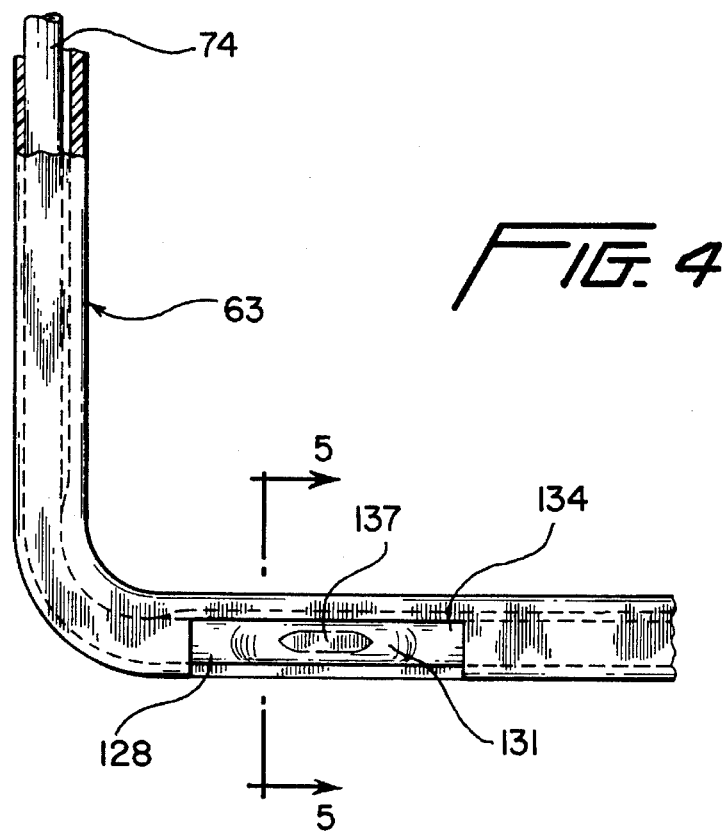
FIG. 4 is a top plan view of a front corner of the basket of FIG. 3.
Figure 5:
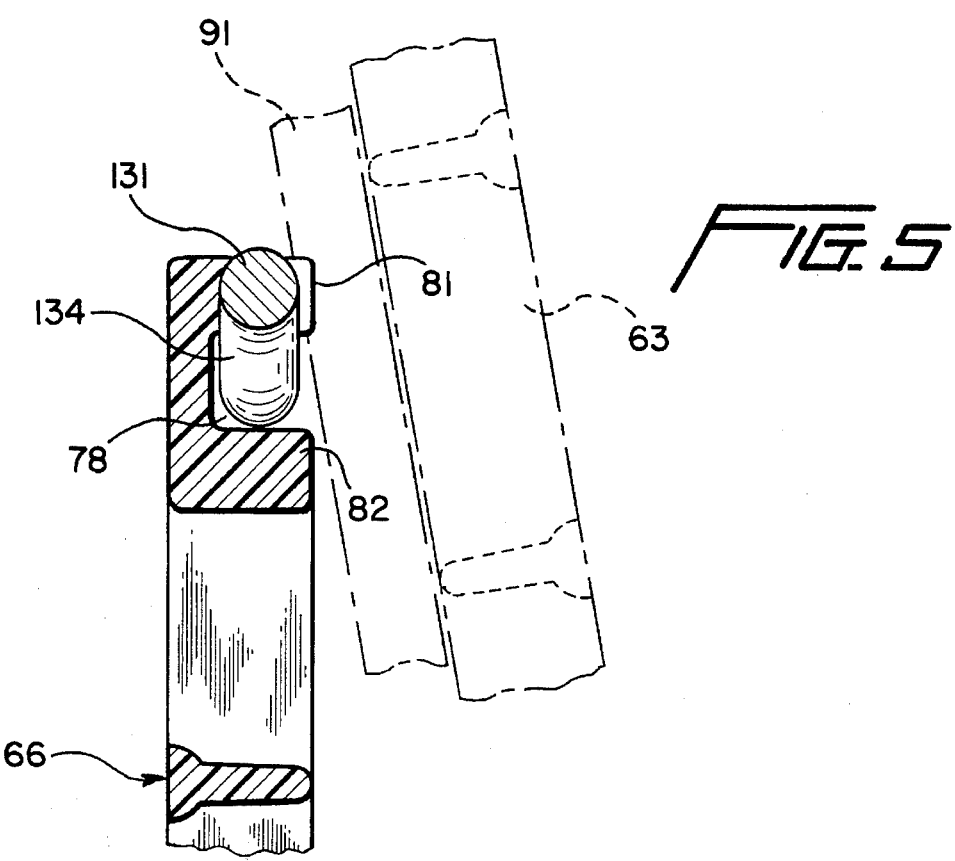
FIG. 5 is a cross-sectional view generally taken along line 5—5 of FIG. 4.

Reference will now be particularly made to FIGS. 3–5 in describing the preferred embodiment of the bumper arrangement of the present invention. As stated above, this bumper arrangement is intended to prevent direct plastic-to-plastic or plastic-to-metal contact between carts upon nesting and unnesting. This bumper arrangement comprises a pair of bumpers 123, 124 that are integrally formed with reinforcing member 74. Since each of these bumpers 123, 124 are similarly constructed, their construction will now be described in detail with reference to bumper 123. Bumper 123 is formed by bending a front portion 130 of reinforcing member 74 upwardly, as indicated at reference number 128, providing a straight portion 131 and then bending reinforcing member 74 downwardly at 134. By this arrangement, it can be readily seen that bumper 123 is offset from a generally longitudinal axis defined by front portion 130 of reinforcing member 74. As best shown in FIG. 5, straight portion 131 projects slightly above rim portion 81 of basket 60. To accommodate bumpers 123 and 124, reinforcing rim portion 81 is formed with cut-outs as illustrated in these Figures.

As clearly shown in FIG. 3, bumpers 123 and 124 are laterally spaced across front panel 66. The spacing between bumpers 123 and 124 directly corresponds to the lateral spacing between support rods 91 and 92 for rear panel 69. By this arrangement, when a cart incorporating the bumper arrangement of the present invention is to be nested with a similarly constructed cart, the straight portion 131 of each bumper 123, 124 will abut a respective support rod 91, 92. As the carts are further nested, support rods 91 and 92 will ride up bumpers, 123 and 124 as rear panel 69 is pivoted. The initial contact between support rod 91 and straight portion 131 of bumper 123 is indicated in phantom in FIG. 5. This arrangement can thereby prevent any plastic-to-plastic or plastic-to-metal contact between the nesting carts which could result in undue wear of the plastic. The lateral length of each bumper 123 and 124 is preferably at least 2–3 times the diameter of each support rod 91, 92 in order to assure an adequate contact area. In addition, in order to enable a smooth engagement as each support rod 91, 92 rides upon a respective bumper 123,124 during nesting and unnesting, straight portions 131 of bumpers 123 and 124 are preferably provided with a flat 137.

From the above description, it should be readily apparent that the plastic basket 60 of a cart 2 formed in accordance with the present invention will be protected from undue wear during nesting and unnesting with similarly constructed carts. By integrally forming the reinforcing member 74 with the bumpers 123, 124, substantial savings in both manufacturing cost and efficiency can be achieved. In addition, the bumper arrangement is more reliable and aesthetically pleasing than the bumper arrangements associated with the prior art.

It is also to be noted that, as seen in FIG. 5, the bumper areas 123, 124 are essentially recessed slightly from the forward most edge of the spaced rim portions 81,82 of basket 60, so that, in the event a basket collides head-on with an object, the metal bumper areas are shielded from direct contact with the object struck. This is particularly important in a cart incorporating a plastic shopping basket where it is highly desirable to avoid any metal to metal contact between the cart and a vehicle on the parking lot of a store using the plastic shopping baskets.

Although described with respect to a preferred embodiment of the invention, it should be readily understood that various changes and/or modifications can be made to the invention as described without departing from the spirit thereof. In general, the invention is only intended to be limited by the scope of the following claims.

I claim:

1. A cart adapted to be nested with similarly constructed carts comprising:

a cart frame having wheels and a pair of upstanding posts;

a plastic basket including a pair of side panels, a front panel, a bottom panel and a rear panel, said front panel being interconnected with said pair of side panels by corners of said basket;

means for mounting said rear panel for pivotal movement about a substantially horizontal axis relative to said side panels and said front panel; and a reinforcing member secured to said upstanding posts and including portions extending along respective upper peripheries of said side panels, around said corners and along said front panel to hold said basket against said posts, the portion of said reinforcing member extending along said front panel having an associated longitudinal axis and including at least one bumper integrally formed as a bent section of said reinforcing member so that said at least one bumper is offset from said longitudinal axis and projects above said front panel, whereby when two of said carts are nested with one another, the at least one bumper of one cart engages and causes pivoting of the rear panel of the other cart.

2. A cart as claimed in claim 1, wherein the portion of said reinforcing member that extends along said front panel is formed with two longitudinally spaced bumpers.

3. A cart as claimed in claim 2, wherein said reinforcing member comprises an endless metal ring.

4. A cart as claimed in claim 2, wherein said mounting means comprises a pair of generally vertically oriented and laterally spaced rear panel support wires attached to said rear panel and lying in a plane spaced rearwardly of a plane defined by said rear panel, each of said rear panel support wires being pivotally supported by said reinforcing member whereby, when two of said carts are nested with one another, the two bumpers of one cart abut the rear panel support wires of the other cart thereby indirectly engaging the rear panel in order to protect the rear panel during nesting.

5. A cart as claimed in claim 1, wherein the portion of said reinforcing member extending along said front panel is defined by a unitary member.

6. A cart as claimed in claim 2, wherein said reinforcing member consists of an endless metal ring.

7. A cart as claimed in claim 1, wherein said bumpers are entirely offset from said longitudinal axis.

8. A cart as claimed in claim 1, wherein said bent section includes an upwardly sloping portion, a substantially horizontal portion and a downwardly sloping portion.

9. A cart as claimed in claim 8, wherein said bumpers are generally circular in cross-section.

10. A cart as claimed in claim 8, wherein said at least one bumper is provided with a flat section along said substantially horizontal portion.

11. A cart as claimed in claim 1, wherein said at least one bumper is generally circular in cross-section.

* * * * *